RAPID LOCK-IN FLYWHEEL SYNCHRONIZING SYSTEM

Filed Oct. 24, 1957 2 Sheets-Sheet 1

INVENTOR
A. D. PERRY, JR.
BY W. L. Keefauver
ATTORNEY

INVENTOR
A. D. PERRY, JR.
BY W. L. Keefauver
ATTORNEY 2,957,045

RAPID LOCK-IN FLYWHEEL SYNCHRONIZING SYSTEM

Albert D. Perry, Jr., Morristown, N.J., assignor to Bell Telephone Laboratories, Incorporated, New York, N.Y., a corporation of New York Filed Oct. 24, 1957, Ser. No. 692,174

12 Claims. (Cl. 178—69.5)

This invention relates to pulse transmission systems and, more particularly, to rapid and accurate synchronizing circuits for use in such systems.

In the transmission of digital information such as pulse-coded data, timing plays an essential part in ascertaining the information content of a particular message wave. In binary coded signals, for example, each code element or digit may have but one of two values. A satisfactory way to represent two such values for transmission purposes is to represent one value by the presence of a pulse in an assigned pulse position and the other value by the absence of a pulse in the assigned pulse position. In order to receive and decode such a signal, however, it is necessary to establish at the receiver a proper time reference for determining the respective pulse positions. The recognition of the specific time intervals alloted to each particular pulse position is the function of a synchronizing circuit.

In many message signal transmission systems, synchronization is obtained by recurrently injecting a distinctive signal, called a synchronizing signal, at regular intervals in the message wave. The synchronizing signal may, for example, be a pulse of different amplitude or different duration than the pulses representing the code elements. The connected receiver recognizes the synchronizing signals by their distinctive character and utilizes their regular occurrence to generate a timing wave. This timing wave is utilized for sampling the message wave at each of the assigned pulse positions to determine its value. Such a synchronizing arrangement, however, uses additional transmission channel capacity which might otherwise be used for the message wave itself.

For many applications, it is more desirable to save this additional required channel capacity by deriving at least a portion of the synchronizing information from the same signals that carry the message itself. Thus, in a two-valued binary coded message, the transitions of the signal from one value to the other can be utilized to provide steady-state synchronization. Such "synchronization recovery" from transitions of the message wave is possible because, at the transmitter, these transitions are constrained to occur only at fixed intervals or at integral multiples thereof. A data transmission system including a synchronizing arrangement of this type will hereinafter be termed a "self-synchronizing" data transmission system.

Self-synchronizing data transmission systems require an accurate clock source at the transmitter and some form of synchronization recovery circuit at the receiver, for example, a "flywheel" synchronization recovery circuit. The flywheel effect, analogous to mechanical inertia, is desirable at the receiver because a transition in the message wave does not necessarily occur at each and every pulse position. Means must therefore be provided for bridging any gap which might occur between successive transitions. Furthermore, after the message wave has been transmitted over a transmission medium of limited bandwidth having delay distortion or subject to noise, the transitions become "jittered," i.e., they are no longer spaced at exactly the same intervals at which they were transmitted, and some averaging of transition intervals must be provided. A flywheel resonating circuit provides this averaging effect by responding slowly to sharp changes in the spacing of successive transitions.

A convenient and economical synchronizing arrangement, however, should also "lock-in" rapidly with the initial signal and should produce properly phased synchronizing signals. A slow build-up to the proper frequency and amplitude wastes channel time while an incorrect phasing of the synchronizing signal will lead to decoding errors, making it necessary to repeat the lock-in procedure to obtain the proper phase, and thus also waste channel time. Such incorrect phasing of the synchronizing circuit can, for example, result from a distortion in the initial pulse train caused by the failure of automatic gain control circuits to exert their control immediately.

An object of the present invention is to synchronize, rapidly and accurately, a pulse receiver with a connected pulse transmitter. A subsidiary object is to avoid the necessity for a continuous, recurring synchronizing signal.

A more specific object of the invention is to secure the long term stabilizing effect of a flywheel type of synchronizing circuit and yet retain the short term advantages of rapid and accurate lock-in not normally associated with flywheel synchronization.

A still more specific object of the invention is to initially enable a synchronization recovery circuit only in response to uniformly spaced pulse transitions, to drive the recovery circuit hard for a short interval after the transitions have become uniform and to thereafter prevent any further disablement of the synchronization recovery circuit, regardless of the spacing of transitions.

In accordance with an illustrative embodiment of the present invention, a synchronizing pulse train, comprising a series of alternate Marks and Spaces, is sent over a data transmission system in advance of the data to be transmitted. This pulse train is examined to determine the distortion present in the length of the intervals between transitions of the pulse train, sometimes called the "bias" of the pulse train. Once having established the substantial uniformity of these intervals (zero "bias"), signals representative of the transitions and having a high amplitude are applied to a high-Q synchronizing resonator to drive the resonator hard, rapidly building up the amplitude of oscillation to a value where the synchronization circuit can lock-in. Signals having a substantially lower amplitude are thereafter applied to the resonator to drive it just sufficiently to maintain the resonator in synchronization. The synchronizing train is then removed and the message wave is transmitted. Widely spaced transitions in the message waves are sufficient to maintain oscillations in the high-Q resonator at the desired frequency and amplitude once it has locked in. The relatively short synchronizing pulse train need not be repeated so long as data transmission continues without unduly long interruption. In this manner, fast and accurate synchronization is obtained without the use of continuously recurrent synchronizing signals. The long term averaging effects of a flywheel resonator are also obtained. The requirement for uniformity of the transitions insures that the resonator is not initially driven hard in the wrong phase.

One feature of the present invention resides in the use of a duty factor or Mark/Space detector to examine the message wave and determine the uniformity of the intervals between transitions of the message wave.

Another feature of the invention resides in the use of a high-Q resonator, such as a tuning fork, to provide a flywheel effect in the synchronization recovery circuit.

Such a resonator will continue to oscillate in synchronism for a long period after the resonator input has ceased and will, in effect, average out the transition intervals.

The major advantage of the present invention over self-synchronizing schemes of the prior art is the rapid lock-in of a flywheel resonator which results from ignoring initial distorted transitions of a synchronizing pulse train and driving the resonator hard once the transitions have become uniform.

These and other objects and features, the nature of the present invention and its various advantages, will appear more fully upon consideration of the specific illustrative embodiment of the invention shown in the accompanying drawings and described in the following detailed explanation of these drawings.

In the dawings:

Figure 1:
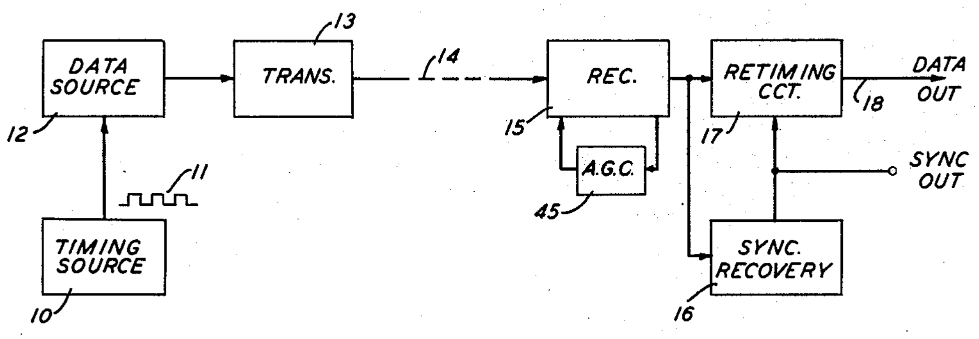
Fig. 1 is a block diagram of a data transmission system suitable for utilizing the present invention.

In Fig. 1 there is shown a block diagram of a data transmission system illustrating the role played by the synchronizing circuits. Timing source 10, which may, for example, be an accurate controlled-frequency oscillator, supplies an accurately timed square wave 11 to data source 12. This square wave 11 is utilized in data source 12 as a timing wave for generating a synchronous serial binary pulse train which may have modulated thereon, by coding techniques, the data to be transmitted. This modulated binary train, comprising a series of Marks and Spaces, is supplied to a transmitter 13 which may comprise an amplitude, phase or a frequency modulator and which prepares the binary train for transmission over a transmission facility 14. Transmission facility 14 may be a radio link, a microwave link or a conventional wire transmission line. The nature of transmitter 13 will, of course, depend on the type of transmission facility available and may even be omitted if transmission can be carried on at baseband without modulation.

The modulated signal appearing on transmission facility 14 is applied to a remotely-positioned receiver 15 which demodulates this signal and derives therefrom the original pulse coded binary train. Receiver 15 has an automatic gain control circuit 45 to stabilize the amplitude of the received pulses. The transitions of these received pulses, however, may no longer occur at synchronous intervals as at transmitter 13 due to the limitations of transmission facility 14. Thus, if transmission facility 14 has a limited bandwidth, a significant amount of delay distortion or any noise, the transitions in the binary train become "jittered," that is, irregularly spaced, so that they are no longer spaced at the regular synchronous intervals at which they were transmitted from transmitter 13. In order to decode this pulse coded binary train accurately, it is necessary to provide at the receiving end of the system a reference timing source to establish the various pulse positions in the binary train, i.e., a synchronization recovery circuit.

Synchronization recovery circuit 16 is provided to perform the function of deriving a reference timing wave from the received "jittered" binary train. An accurate timing wave can be recovered from the jittered signal wave, even though individual transitions are distorted in time, because the over-all average transition interval remains substantially constant, being determined by timing wave 11 from source 10 at the transmitting end. This retiming wave, or as it is better known, synchronizing signal, is applied to a retiming circuit 17 to which the jittered received binary train is also applied.

Retiming circuit 17 utilizes the synchronizing signals from recovery circuit 16 to retime the transitions of the pulse coded binary train. This may be accomplished, for example, by generating a new, synchronous binary train the value of which is determined by the relative valve of the jittered wave at the center of each pulse position. Thus, there is provided on output lead 18 from retiming circuit 17, a replica of the original pulse coded binary train produced at the transmitting end by data source 12. This output on lead 18 not only contains the pulse coded data modulated upon the original timing wave 11 but also includes accurately positioned transitions. The synchronizing signal may also be used in decoding apparatus, not shown.

Figure 2:
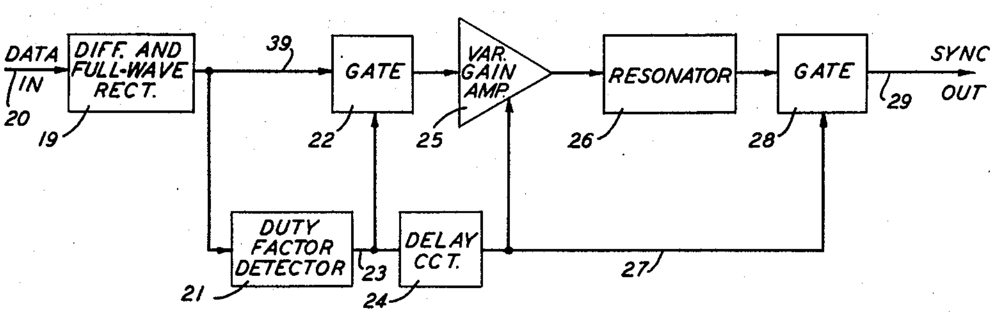
Fig. 2 is a more detailed block diagram of a synchronization recovery circuit in accordance with the present invention.

In a data transmission system such as that illustrated in Fig. 1, it is desirable to have a synchronization recovery circuit which not only averages out the transition intervals in the signal wave but one which will generate these synchronizing signals within a very short interval after transmission begins. In this way a significant amount of transmission time can be saved which might otherwise be used for the transmission of purely synchronizing signals. In accordance with the present invention, a synchronization recovery circuit having these properties is illustrated in Fig. 2. This synchronizing circuit utilizes a short train of alternate Marks and Spaces to lock-in and then maintains synchronization from the transitions of the message wave itself.

Fig. 2 shows in greater detail a synchronization recovery circuit in accordance with the present invention which is suitable for use in a data transmission system such as that illustrated in Fig. 1. Thus, a received pulse train on line 20 is applied to a differentiating and full wave rectifying circuit 19 which derives unidirectional pulses at each of the transitions in the input wave. These pulses are simultaneously applied by way of lead 39 to a duty factor detector 21 and a normally disabled gate 22.

Figure 3:
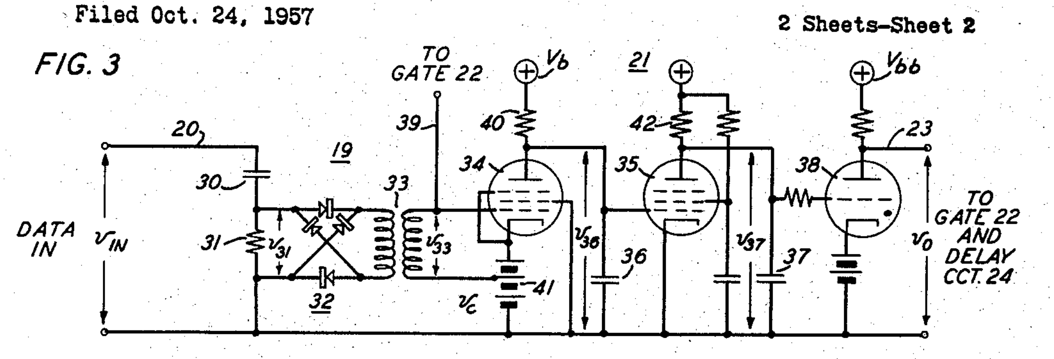
Fig. 3 is a schematic diagram of a differentiating circuit, full-wave rectifier and duty factor detecting circuit suitable for use in the synchronization recovery circuit of Fig. 2.

In order to facilitate rapid synchronization, a short train of alternate Marks and Spaces is sent over the transmission system before the message wave. This short train may be termed a synchronizing train. Duty factor detector 21 is a circuit which detects and times the transitions of the synchronizing train by measuring the intervals between successive transition pulses. When the intervals between successive transitions have become substantially uniform, duty factor detector 21 produces an output on lead 23. A circuit which is suitable for performing this function is illustrated in Fig. 3 and will be more fully described below.

A signal on lead 23 which may, for example, comprise a voltage level significantly different from the voltage level on lead 23 when duty factor detector 21 does not produce an output, enables normally disabled gate 22. Gate 22 may comprise any one of the fast-acting electronic switches known in the art such as, for example, a diode gate. When gate 22 is enabled by a signal on lead 23, the input signal train is applied via gate 22 to a variable attenuating device such as variable gain amplifier 25.

Figure 4:
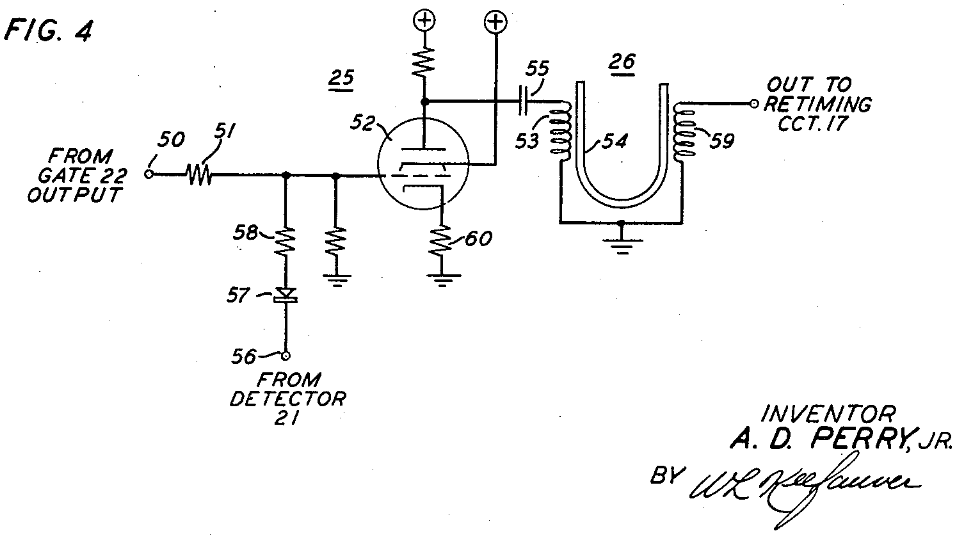
Fig. 4 is a schematic diagram of a variably driven tuning fork resonator suitable for use in the synchronization recovery circuit of Fig. 2.

Variable gain amplifier 25 may comprise any amplifier known in the art and having, for example, a variably attenuated output. One such amplifier is shown in Fig. 4 and will be described below. The gain normally introduced by amplifier 25 is relatively high and hence a signal of high magnitude is normally applied by the amplifier to a resonator 26. Resonator 26, which may comprise any narrow-band, high-Q resonator, is therefore driven hard by the input signals applied to it. Resonator 26 then begins to oscillate with a rapidly increasing amplitude. When this amplitude reaches the desired magnitude, for example, the magnitude required for oscillations at the desired frequency, chosen to be integrally related to the basic pulse repetition rate of the received pulse train, the level of the drive signal is substantially reduced to a level just sufficient to maintain these oscillations at the proper amplitude. The manner in which this is accomplished will now be described.

The output signal from duty factor detctor 21 which is applied to gate 22 is simultaneously applied by way of lead 23 to a delay circuit 24. Delay circuit 24 produces a signal on its output lead 27 a predetermined interval after receiving a signal at its input. The output from delay circuit 24 is applied to variable gain amplifier 25 and operates to reduce the gain introduced by this device. In this way the amplitude of the driving signal for resonator 26 is substantially decreased. The predetermined delay introduced by circuit 24 is, of course, substantially equal to that interval required for resonator 26 to achieve the necessary oscillation amplitude when being driven by the comparatively high amplitude transition pulses.

The output from delay circuit 24 is also applied by way of lead 27 to a second normally disabled gate 28 and operates to enable this gate. Gate 28 thus blocks the output signal from lead 29 until resonator 26 has achieved the desired operating frequency and amplitude. The output signal on lead 29 comprises the desired synchronizing signal. The gates 22 and 28 are "locked up" in the enabled condition after synchronization is once achieved and the message wave transitions are thereafter applied to the resonator 26 through amplifier 25. These message wave transitions will maintain synchronization for the entire duration of the message wave, even though they may not occur at regular intervals. The properties of resonator 26 are such that it will continue to oscillate substantially in synchronism for a prolonged period without any driving signal.

The synchronization recovery circuit illustrated in Fig. 2 and described above combines the features of a long integrating or averaging time and an extremely rapid start-up. The high-Q resonator 26 provides the long integration time. In accordance with the present invention, the logical control circuit, comprising the remainder of the components shown in Fig. 2 operates on an initial synchronizing pulse train to insure rapid start-up. This control circuit decides when to couple an initial driving signal to resonator 26 and when to attenuate this driving signal. Thus, duty factor detector 21, in combination with gate 22, prevents the application of driving signals to resonator 26 until the transitions in the synchronizing pulse train are substantially undistorted. In a data transmission system in which the receiver utilizes automatic gain control (AGC), such as receiver 15 in Fig. 1, the initial transitions of the binary train are very likely to be distorted. This occurs because the AGC circuit does not begin to function immediately but must build up to an operating level. If these initial distorted transitions were not ignored but were immediately applied to resonator 26, it is possible that resonator 26 would be driven in the wrong phase and thus produce an out-of-phase synchronizing signal. Duty factor detector 21 and gate 22 therefore prevent the application of these distorted signals to resonator 26.

In order to assure rapid start-up, however, it is also necessary that a driving signal having a relatively high amplitude be initially applied to resonator 26. Thus, in accordance with the present invention, a variable gain amplifier 25 is provided which serves to apply high amplitude driving signals to resonator 26 for a predetermined interval of time, as determined by delay circuit 24, and thereafter to apply a substantially lower amplitude driving signal to resonator 26. In this way the advantages of a slow-acting resonator capable of integrating over a long interval are provided and, in addition, a fast start-up which is not characteristic of such slow-acting resonators is also provided.

It is important in a synchronization system such as that described that the initial driving signal is properly phased to lock-in the resonator. An improperly phased drive of such a high amplitude will cause a correspondingly large error in the phase of the synchronizing signal and will therefore require a correspondingly long interval for its correction. Thus, a fast start-up and a high-Q resonator are both practical only when duty detection is used in combination with a variable magnitude drive.

In Fig. 3 there is shown a specific circuit suitable for portions of the block diagram of Fig. 2. Thus, the circuit of Fig. 3 operates to differentiate and rectify the received synchronizing pulse train and to detect the duty factor or Mark/Space ratio of these pulses. When this ratio reaches one-half, this circuit produces an output suitable for operating gate 22 and delay circuit 24 of Fig. 2.

The received and demodulated synchronizing pulse train on lead 20 ($v_{in}$) is differentiated by capacitor 30 and resistor 31 to form pulses marking the transitions in the synchronizing pulse train ($v_{31}$). The pulses thus produced are introduced into full wave rectifier 32 in order to obtain unidirectional pulses marking the transitions in the pulse train. These unidirectional pulses ($v_{33}$) are applied by way of coupling transformer 33 to the grid of tube 34 and by way of lead 39 to the input terminals of the normally disabled gate identified as gate 22 in Fig. 2. Tube 34 is a pentode operated as a switch to discharge capacitor 36 when the tube is enabled by a transition pulse on its grid. Tube 34, however, is normally biased to cut off by battery 41 and under this condition capacitor 36 charges to the plate supply voltage through resistor 40. This operation can be better understood by considering the waveforms shown in Fig. 5.

Figure 5:
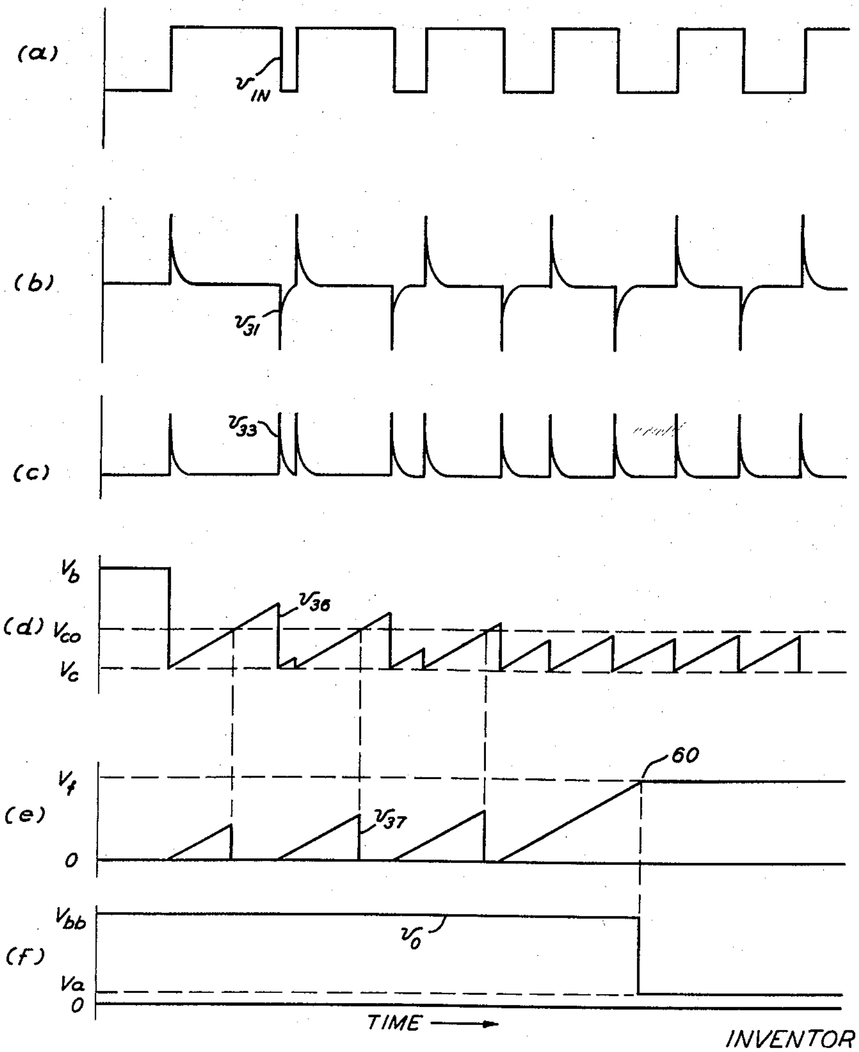
Fig. 5, given for the purposes of illustration, is a graphical and qualitative representation of various typical waveforms helpful in explaining the operation of the circuit of Fig. 3.

In Fig. 5 are shown waveforms (*a*) through (*f*) illustrative of the operation of the circuit shown in Fig. 3. Waveform (*a*) illustrates a synchronizing pulse train $v_{in}$ having typical distortions such as those produced by a receiver with automatic gain control. Such a wave is therefore applied to the data input terminal of the circuit of Fig. 3. This waveform is differentiated in capacitor 30 and resistor 31 to form $v_{31}$ shown as waveform (*b*) in Fig. 5. When rectified by full wave rectifier 32, the differentiated pulses $v_{33}$ appear as shown in waveform (*c*). Waveform (*d*) represents the voltage $v_{36}$ on capacitor 36. Thus, in the absence of a transition pulse, the voltage on capacitor 36 is equal to the plate supply voltage $V_b$. When a pulse is applied to the grid of tube 34, however, capacitor 36 discharges to a voltage level $V_c$ which is substantially that supplied by battery 41 and appearing on the cathode of tube 34, ignoring the small voltage drop across the tube. When the pulse ceases, capacitor 36 begins to charge toward the plate supply voltage $V_b$. The next transition pulse again discharges capacitor 36 which thereafter begins to recharge. Thus, the sawtooth waveform $v_{36}$, shown at (*d*) in Fig. 5, is formed. Whenever the voltage on capacitor 36 rises to the cutoff voltage $V_{co}$ of tube 35, this tube conducts.

Tube 35 is another pentode operated as a switch and has its cathode grounded and a capacitor 37 connected across its output. When tube 35 is turned on, i.e., is conducting, capacitor 37 remains substantially at the cathode potential of tube 35, i.e., ground potential. When tube 35 is cut off, however, capacitor 37 begins to charge toward the plate supply voltage through resistor 42. Tube 35, of course, is turned on when the voltage on capacitor 36 rises above the cut-off bias potential $V_{co}$ of the tube as shown at waveform (*d*) of Fig. 5. The waveform $v_{37}$ appearing on capacitor 37 is shown as waveform (*e*) in Fig. 5. Thus, since capacitor 36 is charged to the plate supply voltage when no signal is supplied, tube 35 remains enabled under this condition, and the voltage on capacitor 37 remains at zero. When capacitor 36 is discharged, however, by the operation of tube 34, tube 35 is cut off and capacitor 37 begins to charge toward the plate supply voltage. Before long, however, capacitor 36 has again charged up above the cut-off potential of tube 35 and capacitor 37 is again discharged to ground.

It can be seen that as long as capacitor 36 is allowed to charge up beyond the cut-off bias of tube 35, capacitor 37 will continue to be discharged. The charging curve for capacitor 36, as determined by the values of resistor 40 and capacitor 36, is chosen such that capacitor 36 will charge to a point just below the cut-off bias of tube 35 when the transition pulses are equally spaced. If the transition pulses are not equally spaced, capacitor 36 is allowed to charge up sufficiently to turn on tube 35 and discharge capacitor 37. If tube 35 remains cut off for the space of several inter-transition intervals, it is apparent that these intervals have became substantially constant. When this occurs, capacitor 37 is allowed to charge to the firing potential $V_f$ of gas tube 38, as illustrated at 60 in waveform (*e*) of Fig. 5. When gas tube 38 fires, the voltage $V_0$ on its plate drops sharply as shown by waveform (*f*) in Fig. 5. This sharp drop in the plate voltage of tube 38 is applied by way of lead 23 to a delay circuit such as delay circuit 24 shown in Fig. 2. This drop in plate voltage of tube 38 is also applied to the control terminals of gate 22. Gas tube 38 may be chosen such that random spacing of the pulses in the message wave, resulting in the intermittent re-energization of tube 35, will not be sufficient to cut off the gas tube. This is easily accomplished by utilizing a gas tube requiring a sufficiently large negative voltage to be extinguished. Alternately, the output of tube 38 may be utilized to operate a "lock-up" relay which removes duty factor detector 21 from the circuit.

The duty factor detector described and shown in Fig. 3 is only illustrative of one possible circuit which might perform this function. Pentodes 34, 35 and 41 may, of course, be replaced by suitable triodes or the entire circuit of Fig. 3 may be replaced by other suitable timing circuits. In any event, however, it is necessary that this circuit operate to produce an output only after the duty factor of the input pulse train has become stabilized and remains in that condition for a period of several cycles.

In Fig. 4 is shown a tuning fork resonator and a circuit suitable for providing a variable gain drive to such a resonator. Thus, when gate 22 of Fig. 2 is enabled, a series of pulses, illustrated in waveform (*c*) of Fig. 5 and marking the transitions of the original synchronizing pulse train, is applied to the input terminal 50 of the circuit of Fig. 4. These pulses are applied by way of resistor 51 to the grid of amplifying tube 52. Diode 57 is normally reverse biased and resistor 58 is effectively out of the circuit. Tube 52 serves to amplify the pulses on its grid and apply them to a driving coil 53 of a tuning fork resonator 54. A capacitor 55, inserted in series with coil 53, is selected to be resonant with coil 53 at the desired oscillation frequency of tuning fork resonator 54 to increase its selectivity. The bias on tube 52 is normally maintained by self-biasing resistor 60 at a level such that tube 52 provides substantial amplification of the input pulses. Tuning fork resonator 54 is driven hard by these amplified pulses to the desired frequency and amplitude of vibration.

After a sufficient interval to allow resonator 54 to attain its desired amplitude of vibration, a signal is applied to terminal 56. Terminal 56 is normally at a voltage such as to reverse bias diode 57 so that resistor 58 has no effect on the input to tube 52. However, a signal derived from delay circuit 24 of Fig. 2 which may comprise, for example, a substantial drop in direct current voltage levels, forward biases diode 57 and effectively inserts resistor 58 across the input circuit to tube 52. Resistors 51 and 58 act as a voltage divider to apply only a portion of the input signal at terminal 50 to the grid of tube 52. If the value of resistor 51 is chosen to be much greater than the value of resistor 58, a substantial attenuation is introduced in the input signal. This signal, when amplified by tube 52, is just of sufficient magnitude to maintain tuning fork 54 at the desired amplitude and frequency of vibration but is insufficient to increase the amplitude of vibration. The synchronizing pulse train then ceases and the message wave is transmitted. The transitions of the message wave continue to maintain this synchronization. The synchronizing signal is taken from across an output coil 59 of tuning fork resonator 54. This output, when properly shaped, comprises a very accurate synchronizing signal which may be used to retime the received pulse train.

The resonator is shown as a tuning fork in Fig. 4 for illustrative purposes only. Any other narrowband, high-Q circuit, such as, for example, a simple resonator or a multi-stage filter, would be equally suitable for the present invention. Furthermore, the center frequency of this circuit may be some integral multiple of the basic repetition rate of the received pulse train rather than equal to this repetition rate itself. Suitable frequency dividers must, of course, be provided in such a case to reduce the frequency of the synchronizing signal to the basic pulse repetition rate. A greater effective tuning accuracy is, however, maintained with a resonator having a higher resonant frequency.

It is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In a data transmission system including a data transmitter and a data receiver, means for maintaining said data receiver and said data transmitter in synchronism comprising, in combination, a tuning fork, a normally disabled driving circuit coupled to said tuning fork and responsive to received signals, when enabled, for driving said tuning fork into oscillation, means for enabling said driving circuit in response to received signals having a duty factor of substantially fifty percent, and means for attenuating the output of said driving circuit a predetermined interval after operation of said enabling means.

2. Means for deriving synchronizing signals from a train of pulses comprising resonating means, means responsive to said train of pulses for driving said resonating means into oscillation, normally disabled gating means connected to inhibit said driving means when disabled, means for enabling said gating means in response to a duty factor of said train of pulses substantially equal to a predetermined value, attenuating means, and means for automatically connecting said attenuating means to said driving means a predetermined interval after the operation of said enabling means.

3. Means for deriving synchronizing signals according to claim 2 wherein said resonating means includes a tuning fork vibrator.

4. A synchronizing circuit for synchronizing with a series of pulses comprising an oscillatory device, means for producing a driving pulse for each change in polarity of said series of pulses, normally disabled gating means for applying said driving pulses to said oscillatory device, means for detecting the durations between successive driving pulses, and means, responsive to said detecting means, for enabling said normally disabled gating means when and only when said durations are substantially constant.

5. In a synchronous pulse transmission system, the combination of a tuning fork oscillation circuit, means for generating a driving pulse for each transition of the pulses in said transmission system, means for applying said driving pulses to said tuning fork oscillation circuit to induce oscillations therein, and means for automatically attenuating said driving pulses after a predetermined interval.

6. In a pulse transmission system, means for deriving transition signals from polarity transitions in the pulses transmitted in said system, a resonator connected to be driven by said transition signals, normally disabled gating means connected to block said transition signals from said resonator, means for detecting the substantial uniformity of duration of said pulses, said detecting means connected to enable said normally disabled gating means, and means for automatically adjusting the amplitude of said transition signals.

7. Control means for a synchronization recovery circuit in a pulse receiver comprising normally disabled resonating means, means for enabling said resonating means in response to successive pulses of equal duration, means for driving said resonating means with driving signals at a first magnitude for a first predetermined interval following the operation of said enabling means, and means for adjusting said driving means to drive said resonating means with driving signals at a second magnitude for a second interval following said first predetermined interval.

8. A synchronization recovery circuit for a pulse transmission system comprising means for deriving unidirectional pulses from a received pulse train, means for detecting the duty factor of said received pulse train, variable attenuating means, first circuit means for applying said derived pulses to said variable attenuating means only when the duty factor of said received pulse train is substantially of a predetermined value, means for adjusting said variable attenuating means a predetermined interval after operation of said first circuit means, tuning fork resonating means, second circuit means for applying the output of said variable attenuating means to said resonating means, and means for obtaining a synchronizing signal from said tuning fork resonator.

9. In a data transmission system including a data transmitter and a data receiver having automatic gain control, synchronizing means for maintaining said receiver in synchronism with said transmitter, said synchronizing means comprising means at said transmitter for transmitting a series of alternate Mark and Space signals having a predetermined duty factor and means at said receiver for generating a wave in synchronism with said Mark and Space signals comprising a tuning fork, a normally disabled driving circuit coupled to said tuning fork and responsive to received signals, when enabled, for driving said fork into oscillation, means for enabling said driving circuit in response to received Mark and Space signals having a duty factor substantially equal to said predetermined duty factor, and means for substantially reducing the drive on said tuning fork by said driving circuit a predetermined interval after the enabling of said driving circuit.

10. The combination according to claim 9 wherein said predetermined interval is substantially equal to the time required for said tuning fork to be driven from rest to a predetermined amplitude of oscillation.

11. In a data transmission system including a transmitter and a receiver interconnected by an imperfect transmission medium, means at said transmitter for applying to said medium a synchronizing pulse train having a duty factor of fifty percent, means at said receiver for detecting the duty factor of the received synchronizing pulse train, oscillation means, means responsive to said detecting means for exciting oscillations in said oscillation means when and only when the duty factor of said received pulse train is substantially equal to unity, and means for partially disabling said exciting means after said oscillation means achieves a preselected frequency of oscillation.

12. The combination according to claim 11 further including means at said transmitter for transmitting a message wave immediately following said synchronizing pulse train, and means at said receiver for utilizing the output of said oscillation means for retiming said message wave.

References Cited in the file of this patent

UNITED STATES PATENTS

| | | |
|---|---|---|
| 2,230,092 | Schunack et al. | Jan. 28, 1941 |
| 2,233,881 | Below | Mar. 4, 1941 |
| 2,802,051 | Prior | Aug. 6, 1957 |